(12) United States Patent
Schreiter et al.

(10) Patent No.: US 7,471,452 B2
(45) Date of Patent: Dec. 30, 2008

(54) ILLUMINATED AIMING DEVICE FOR AN OBSERVATION INSTRUMENT

(75) Inventors: Gerd Schreiter, Weilburg (DE); Torsten Possner, Jena (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 11/736,805

(22) Filed: Apr. 18, 2007

(65) Prior Publication Data

US 2007/0247625 A1    Oct. 25, 2007

(30) Foreign Application Priority Data

Apr. 19, 2006    (DE) .................. 10 2006 018 967

(51) Int. Cl.
*G02B 23/00*    (2006.01)
(52) U.S. Cl. ........................ 359/428; 359/427
(58) Field of Classification Search .......... 359/407–431
See application file for complete search history.

(56) References Cited

U.S. PATENT DOCUMENTS

| | | | |
|---|---|---|---|
| 5,148,603 A * | 9/1992 | Beutler | 33/265 |
| 5,157,839 A | 10/1992 | Beutler | |
| 5,285,517 A * | 2/1994 | Wu | 385/142 |
| 2002/0080480 A1 | 6/2002 | Stingl | |
| 2004/0085631 A1* | 5/2004 | Mueller | 359/407 |

FOREIGN PATENT DOCUMENTS

| | | |
|---|---|---|
| DE | 94 20 382.2 | 3/1995 |
| DE | 197 26 397 A1 | 12/1998 |
| DE | 299 03 989 U1 | 7/1999 |
| DE | 100 51 448 A1 | 5/2002 |
| EP | 0 718 585 A1 | 6/1996 |
| EP | 0 886 163 B1 | 12/1998 |
| JP | 2-100219 | 4/1990 |
| JP | 2-100219 | 8/1990 |
| WO | WO 03/040800 A1 | 5/2003 |

OTHER PUBLICATIONS

Naumann et al., Bauelemente der technischen Optik, Taschenbuch der technischen Optik, Muenchen, Carl Hanser Verlag, 1992, pp. 419-423.

* cited by examiner

*Primary Examiner*—Thong Nguyen
(74) *Attorney, Agent, or Firm*—Harness, Dickey & Pierce, P.L.C.

(57) ABSTRACT

An illuminated aiming device for an observation instrument comprises a reticle plate, an aiming mark provided at the reticle plate, and a light source directed onto the aiming mark via a light guide. The light guide is configured as a wave guide within the reticle plate.

10 Claims, 1 Drawing Sheet

ILLUMINATED AIMING DEVICE FOR AN OBSERVATION INSTRUMENT

FIELD OF THE INVENTION

The invention is related to the field of aiming devices.

More specifically, the invention is related to the field of illuminated aiming devices for observation instruments, in particular aiming telescopes for firearms.

Still more specifically, the invention is related to an illuminated aiming device for an observation instrument comprising a reticle plate, an aiming mark provided at the reticle plate, and a light source directed onto the aiming mark via a light guide.

BACKGROUND OF THE INVENTION

Aiming devices for aiming telescopes conventionally have a glass reticle plate within the optical path of the aiming telescope. The reticle plate is arranged transverse to the optical axis of the telescope. An aiming mark is provided on or within the reticle plate, for example by means of etching or engraving. The aiming mark may have different shapes, for example the shape of a point, of one or more lines, of a cross hairs or the like.

In this context it is well known to illuminate the aiming mark by means of a light source in order to be able to aim also under bad light conditions.

Published U.S. patent application Ser. No. 2002/0080480 A1 (=DE 100 51 448 A1) discloses an illuminated reticle plate. This prior art reticle plate is provided with an essentially ring-shaped light guide being arranged around the reticle plate. The light of a diode is emitted into the light guide via a flat portion of the light guide and is coupled into the reticle plate over the entire periphery thereof with equal light distribution.

German Utility Model specification DE 299 03 989 U1 describes an aiming mark within a telescope which, as seen from the objective lens of the telescope, is arranged on the rear side of a beam splitter. An aperture stop is provided above the upper side of the upper prism of the beam splitter and a light source, i.e. a light-emitting diode (LED), is arranged above the aperture stop. The light beam delimited by the aperture stop impinges on the contact surface of the prisms as an aiming mark, for example as a light point.

In an aiming device according to European Patent Specification EP 886 163 B1(=DE 197 26 397 A1) the light is likewise irradiated into the narrow side of a reticle plate and is emitted therefrom perpendicular from its surface by means of a mark configuration consisting of a pattern of alternating transparent gaps and opaque ridges.

These prior art aiming devices have the common disadvantage that the light efficiency is quite poor. In some aiming devices there is also a considerable amount of stray light so that there is the risk that the image of the aiming object is overirradiated under poor light conditions. Further, these aiming marks may only be configured in a limited range of designs.

German Utility Model specification DE 94 20 382 U1 discloses an aiming telescope with an illuminated aiming device. The aiming device utilizes a reticle plate being worked from a circular glass plate. The reticle plate consists of a ring having three glass ridges projecting inwardly therefrom till close to the ring center and being spaced relative to each other in a circumferential direction by 90° each. Thereby, an aiming mark is configured being similar to the so-called "Mark No. 1". The glass ridges are illuminated from the ring. At its free end, the middle glass ridge is pointed and the point is flattened, such that the flattened edge emits the irradiated light in an axial direction. The marksman sees this arrangement as a light-emitting arrow point.

In this prior art aiming device the light efficiency is better, however, the glass ridges positioned in the marksman's field of vision are disturbing. Moreover, the reticle plate is an extremely fragile element that can hardly be used under rough ambient conditions, as frequently occur during the practical use of aiming telescopes. Further, the glass ridges have to be manufactured with polished surfaces, because otherwise an uncontrolled emission of light would occur at the glass ridges' surfaces which would result in a considerable stray light. However, polishing is hardly possible in view of the filigree structure of the reticle plate.

SUMMARY OF THE INVENTION

It is, therefore, an object underlying the invention to further improve an aiming device of the type specified at the outset, such that the afore-mentioned disadvantages are avoided. In particular, the aiming device shall be operable with a minimum of light power, shall operate without generating stray light and shall allow a large variety of aiming marks.

In an aiming device of the type specified at the outset, this object is achieved in that the light guide is configured as a wave guide within the reticle plate.

The object underlying the invention is, thus, entirely solved.

By using a light wave guide integrated into the reticle plate, almost the entire light of the light source may be guided to the location of the aiming mark. Therefore, a sufficient illumination of the aiming mark alone may be achieved at low light power. One has not to expect stray light generation, let alone an over-irradiation of the aimed image because the light of the light source is totally reflected at the boundary surfaces of the light guide, and, therefore, may not exit laterally. The configuration of the aiming mark may be selected arbitrarily and may be manufactured by known processes, for example by etching or engraving.

In a preferred embodiment of the invention, the wave guide is configured as a slab wave guide within a broad side of the reticle having a predetermined width.

In an alternate, second embodiment of the invention, however, the wave guide is a stripe wave guide within a broad side of a reticle having a predetermined width and a predetermined height.

These two alternatives enable to make specific light guide from the light source to the aiming mark, depending on the complexity that one is ready to accept.

According to the invention, the light source is connected to a narrow side of the reticle plate.

The aiming mark may be worked into the reticle plate, in particular by etching or engraving.

Finally, it is particularly preferred, when the reticle plate consists of a glass and the wave guide is made within the glass by ion exchange.

This measure has the advantage that light wave guides may be configured within the reticle plate at high precision and in arbitrary designs by utilizing well-proven processes.

Further advantages will become apparent from the description and the enclosed drawing.

It goes without saying that the features mentioned before and those that will be mentioned hereinafter, may not only be used within the particularly given combination, but also in other combinations or alone, without leaving the scope of the present invention.

BRIEF DESCRIPTION OF THE DRAWINGS

Embodiments of the invention are shown in the drawing and will be explained in further detail throughout the subsequent description.

DETAILED DESCRIPTION OF THE PREFERRED EMBODIMENTS

Figure 1:
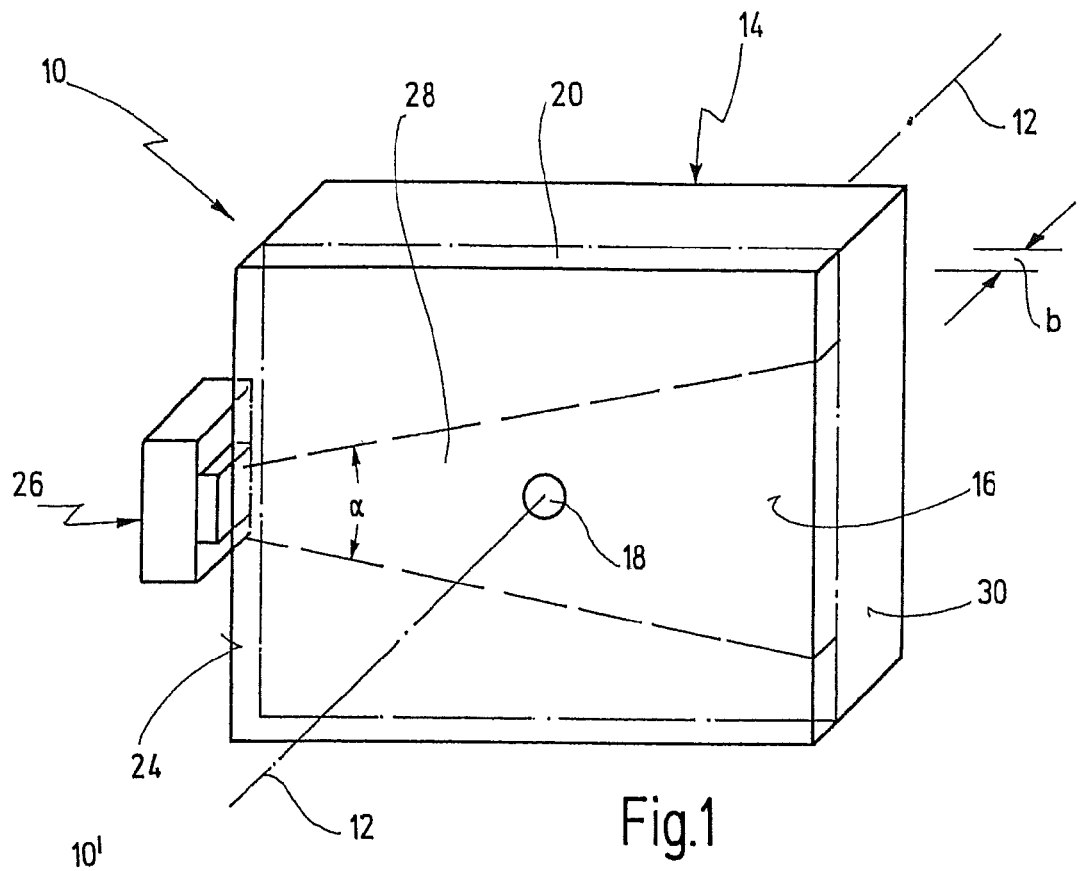
FIG. 1 shows a perspective and highly schematic view (not to scale) of a first embodiment of an aiming device according to the invention.

In FIG. 1, reference numeral 10 as a whole designates a first embodiment of an aiming device according to the present invention. Aiming device 10 is housed within an optical or digital observation instrument, for example within an aiming telescope (not shown). The optical axis of the optical instrument is designated 12.

A reticle plate 14 is arranged along optical axis 12 and oriented perpendicular thereto. Reticle plate 14 is provided with an aiming mark 18 at its front side 16 shown in front of FIG. 1. If aiming device 10 is housed within an aiming telescope, front side 16 of reticle plate 14 faces the objective lens of the aiming telescope.

In FIG. 1, aiming mark 18 is shown as a point. However, this is only to be understood as an example. Aiming mark 18 may have any conceivable configuration, for example the configuration of a line or a circle pattern, a cross hair, etc. Aiming mark 18 is worked into front side 16 of reticle plate 14, for example by etching, mask-based etching with ion beams, wet-chemical etching, cutting of ridges or structures, engraving, laser engraving, etc. Aiming mark 18 may also be configured white, as is known per se.

A slab wave guide 20 is worked into front side 16 of reticle plate 14. In the embodiment shown, slab wave guide 20 covers the entire front side 16 and has a width b. Slab wave guide 20 is generated within the material of reticle plate 14 by an appropriate process. When the material is glass, such a light wave guide may, for example, be generated by an ion exchange process within the glass, having a width b on front side 16.

On the narrow side of reticle plate 14 shown left in FIG. 1, a light source 26 is put onto a right side surface 24. Light source 26 may be a light-emitting diode (LED), a laser diode, or another appropriate light source. The light source may be directly coupled with its front surface to side surface 24. As an alternative, it may also be coupled via a micro-optics having lenses or may be coupled via glass or plastic material wave guides, for example fibers, from a location distant from reticle plate 14.

Light source 26 irradiates a light beam 28 from side surface 24 into slab wave guide 20. Light beam 28 has a spatial aperture angle α which depends from the output optics of light source 26 and the transition into slab wave guide 20. Light beam 28 propagates within slab wave guide 20 by total (wave guide) reflection.

Light beam 28 illuminates aiming mark 18 laterally. Aiming mark 18, hence, appears to the marksman as a distinct radiant figure. Light beam 28 is delimited along the direction of optical axis 12, i.e. transverse to its direction of propagation, by the boundary surface to the glass of the reticle plate (rear) and by the ambient air (front). It may only exit on a right side surface 30 of slab wave guide 20 opposite left side surface 24. It would be appropriate to provide a light trap (not shown) at the position of right side surface 30.

Figure 2:
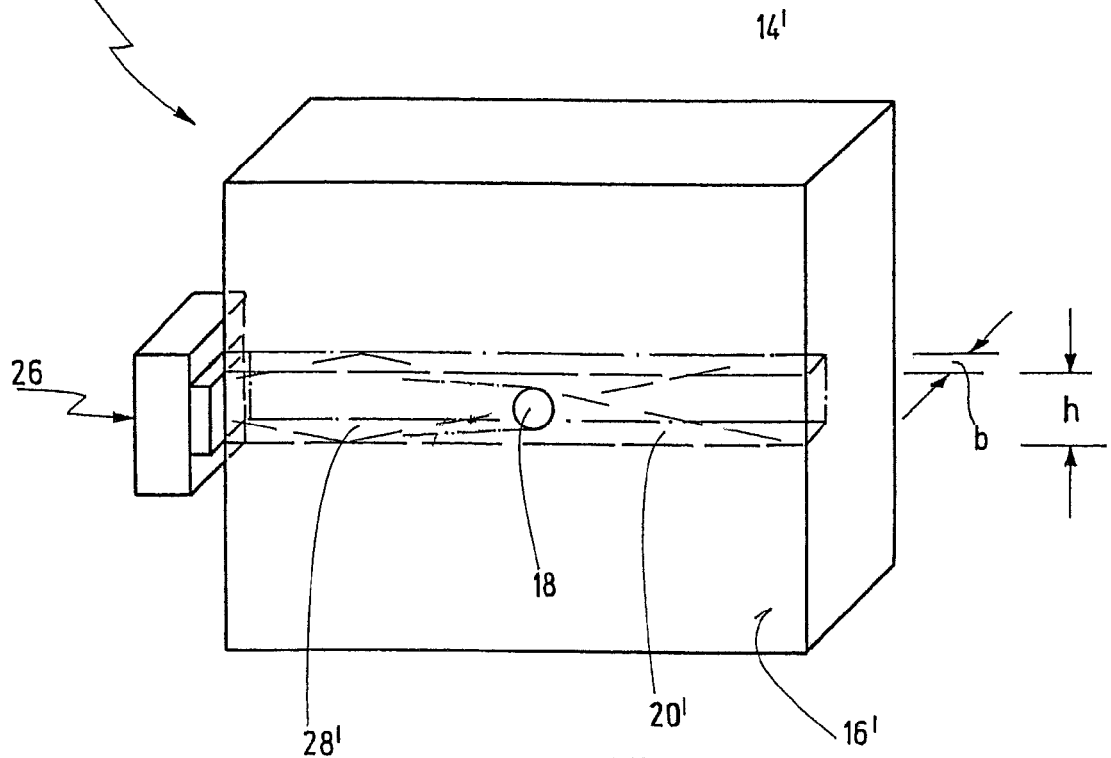
FIG. 2 is an illustration, similar to that of FIG. 1, however, for a second embodiment of the invention.

The embodiment of FIG. 2 shows a modification for which same reference numerals are used as in FIG. 1, and modified elements are designated by the addition of an apostrophe.

In this embodiment, a stripe wave guide 20' having a width b and a height h is worked into front side 16' of reticle plate 14'. Stripe wave guide 20' delimits the propagation of light beam 28' in the illustration of FIG. 2 additionally in an upward and in a downward direction. Thereby, the yield of light beam 28' at the location of aiming mark 18 is further enhanced as compared to the embodiment of FIG. 1, because light beam 28' is still more specifically guided to aiming mark 18.

Within the scope of the present invention, the light wave guide, instead of being "buried" according to FIGS. 1 and 2, may also be applied onto front side 16 of reticle plate 14, for example in a configuration with a layer from an optical polymer or a glue having optical properties. Thereby, it also configures an integral portion of reticle plate 14. The index of refraction of the material of such an externally-applied light wave guide must be higher than that of the adjoining glass.

The invention claimed is:

1. An illuminated aiming device for an observation instrument comprising a reticle plate made of glass, an aiming mark provided at said reticle plate, and a light source directed onto said aiming mark via a light guide, wherein said light guide is configured as a light wave guide structure within said reticle plate, said light wave guide structure being generated within said glass reticle plate through ion exchange and being configured as a slab wave guide within a broad side of said reticle having a predetermined width.

2. The aiming device of claim 1, wherein said light source is connected to a narrow side of said reticle plate.

3. The aiming device of claim 1, wherein said aiming mark is worked into said reticle plate.

4. The aiming device of claim 3, wherein said aiming mark is etched into said reticle plate.

5. The aiming device of claim 3, wherein said aiming mark is engraved into said reticle plate.

6. An illuminated aiming device for an observation instrument comprising a reticle plate made of glass, an aiming mark provided at said reticle plate, and a light source directed onto said aiming mark via a light guide, wherein said light guide is configured as a light wave guide structure within said reticle plate, said light wave guide structure being generated within said glass reticle plate through ion exchange and being configured as a stripe wave guide within a broad side of said reticle having a predetermined width and a predetermined height.

7. The aiming device of claim 6, wherein said light source is connected to a narrow side of said reticle plate.

8. The aiming device of claim 6, wherein said aiming mark is worked into said reticle plate.

9. The aiming device of claim 8, wherein said aiming mark is etched into said reticle plate.

10. The aiming device of claim 8, wherein said aiming mark is engraved into said reticle plate.

* * * * *